123,905

UNITED STATES PATENT OFFICE.

HENRY HOWSE, OF LONDON, GREAT BRITAIN.

IMPROVEMENT IN SAFETY-MATCHES.

Specification forming part of Letters Patent No. 123,905, dated February 20, 1872.

SPECIFICATION.

I, HENRY HOWSE, of the city of London, in the United Kingdom of Great Britain and Ireland, have invented "a new or Improved Manufacture of Safety-Matches," of which the following is a specification:

Whereas it is well known that a very great number of serious and even fatal accidents by fire are occasioned by persons carelessly throwing down matches which are believed to be harmless because the flame has been extinguished, but which in reality are highly dangerous, and quite capable of communicating fire to any light dry material upon which they may chance to drop, in consequence of the matches being still at a heat that will produce ignition in such materials, though they are not actually in a flame, therefore I have invented the following new or improved manufacture of "safety"-matches; the first part of which invention consists in saturating or impregnating the splints (previously to their being "dipped" in the igniting composition, which forms the second part of the invention) in a solution of any of the chemical salts or substances hereinafter described or referred to, (or those having a like property,) which have the property of preventing the matches from remaining at a red or at an igniting heat after the flame has been extinguished without being in any way detrimental to the inflammable nature of the matches, and thus to prevent the possibility of accident from the dropping of a match after the extinction of the flame. The second part of the invention consists in incorporating in the igniting material (in which the splints are "dipped" after having been treated as above mentioned) portions of any or all of the same chemical substances, which addition prevents the igniting composition retaining fire or heat after the flame has left it.

I will now proceed to describe more in detail the manner of carrying my invention into practical effect.

The saturating or impregnating substance with which the splints are first treated, which I have found to answer well in practice, (and which also has the advantage of being so inexpensive as not materially to add to the cost of the matches,) is alum; but there are other well-known chemical salts or substances having similar properties which I likewise use, and which answer the same purpose; for example, among those which I have found by experiment to effect the desired object, and which are also sufficiently inexpensive to be made commercially available for the purpose, are the following: Sulphate of magnesia or common epsom salts, tungstate and silicate of soda, borate, chloride, sulphate, and phosphate of ammonia, and sulphate of zinc, and generally salts of the metals of the alkalies, either alone or mixed with other salts, (not incompatible with each other;) or salts of the alkaline earths will similarly answer the purpose of my invention; but I prefer to use the tungstate or silicate or the borate, phosphate, or sulphate of soda; and with regard to the salts of the alkaline earths, I prefer those of barium and strontium, expecially when mixed with other salts of the classes that I have enumerated; also salts of aluminium, especially the double salt, the sulphate of alumina, or potash may be used. With respect to the salts of the metals, I prefer those of the zinc class, especially sulphate of zinc and magnesia, and those belonging to the tungsten class, and especially the soluble tungstate, and the soluble borates and sulphates, phosphates, and silicates; but I do not recommend deliquescent salts, but prefer those which are efflorescent. The improved igniting composition in which the splints are subsequently dipped to complete the manufacture of the matches is made by incorporating with the usual ingredients thereof portions of any or all of the above-named or referred-to chemical substances, the relative quantities being dependent upon those used, but ranging from one to twenty per cent. is sufficient, which addition renders it necessary to increase the igniting property of the composition by using a larger proportion of chloride of potash or phosphorus than is usual, which proportion again is dependent upon the substances forming the addition.

The mode of conducting the manufacture of the improved "safety"-matches is as follows: The splints of the matches, before "dipping," are immersed in (or otherwise impregnated with) a strong solution of alum, or of any other of the substances hereinbefore mentioned or referred to, or of any combination of such substances, for a sufficiently long time to effect a complete saturation or absorption into the material of the splints of the solution with which they are treated. The time required varies, according to the chemical substances and the quality of wood used; but, as a general rule, I find that the splints ought to be steeped or saturated in the solution of the chemical substances above mentioned or referred to for forty-eight hours, or thereabout. After being thus saturated, the splints are drained and dried and then "dipped" in the ordinary manner in the improved igniting composition above described, which completes the manufacture of the improved matches.

Matches so manufactured ignite and burn in a flame as readily as any other matches; but the instant that the flame is blown out or otherwise extinguished, the match becomes black and does not smoulder, but is perfectly harmless, as it does not drop any ash, besides not being so liable to drop or fall in pieces as those hitherto manufactured.

Having now described the nature and object of my said invention "for a new or improved manufacture of safety-matches," together with the manner in which the same is to be or may be performed or carried into practical effect, I remark, in conclusion, that what I claim as my invention is—

The new or improved manufacture of "safety"-matches accomplished, as hereinbefore fully described, namely, first, by saturating or treating the splints (of which the matches are subsequently to be manufactured) with a solution of alum or of any other of the chemical substances hereinbefore named or referred to, or of any combination or mixture of such chemical substances; and, secondly, by the addition of portions of any or all of such chemical substances to the igniting composition as usually compounded, in which improved composition the splints (subsequently to their being treated as above described) are "dipped" to complete the manufacture of the improved "safety"-matches, both for the purpose of preventing the possibility of accident arising from the dropping of a match after the extinction of the flame thereof.

In testimony whereof I have signed my name to this specification before two subscribing witnesses.

HENRY HOWSE.

Witnesses:
 CHARLES AUBREY DAY,
  *Draughtsman, 14 High street, Stepney, London, E.*
 JOHN GYNNE,
  *Clerk to David Burwash & Son, Public Notaries, 21 Birchin Lane, London.*